United States Patent Office 3,100,230
Patented Aug. 6, 1963

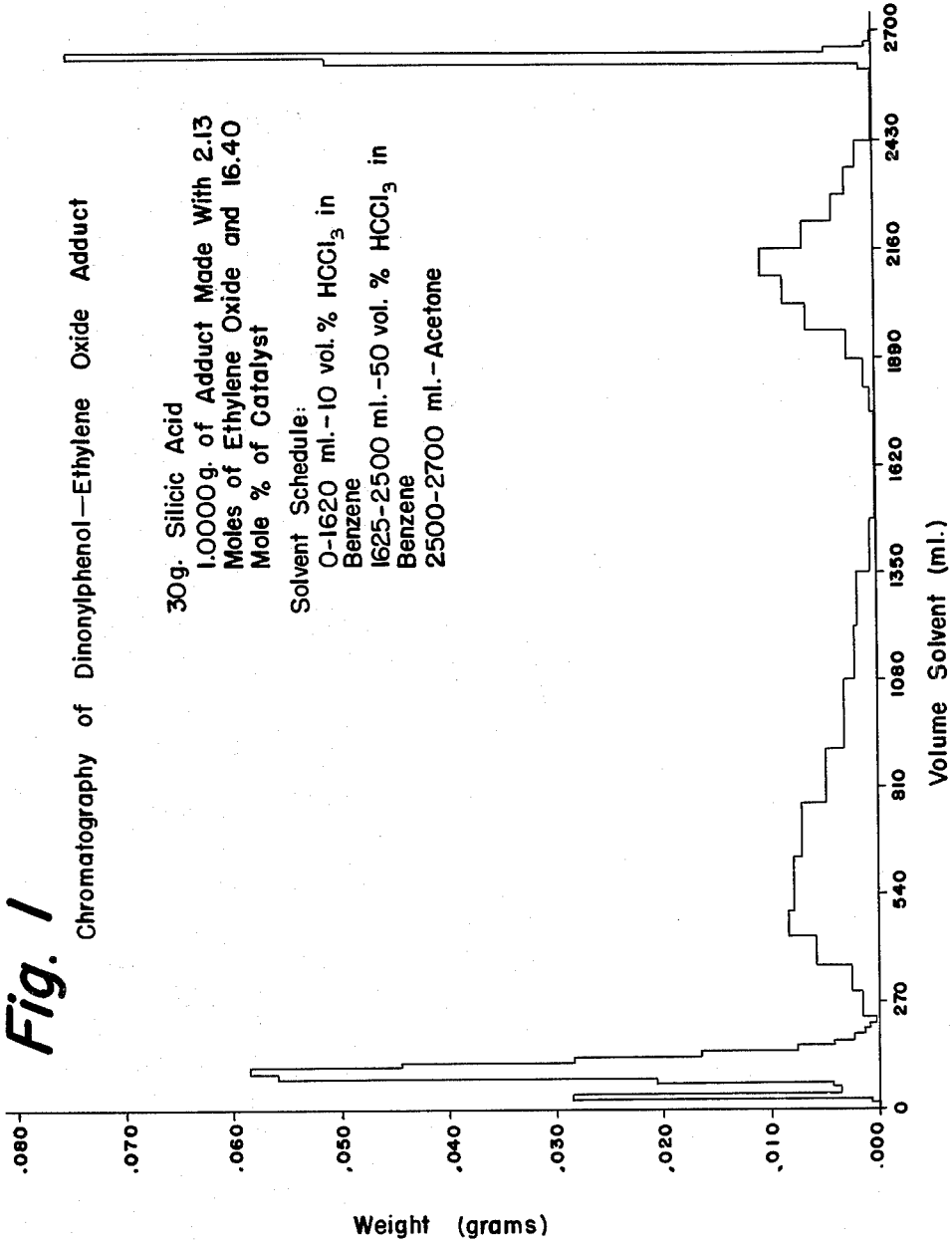

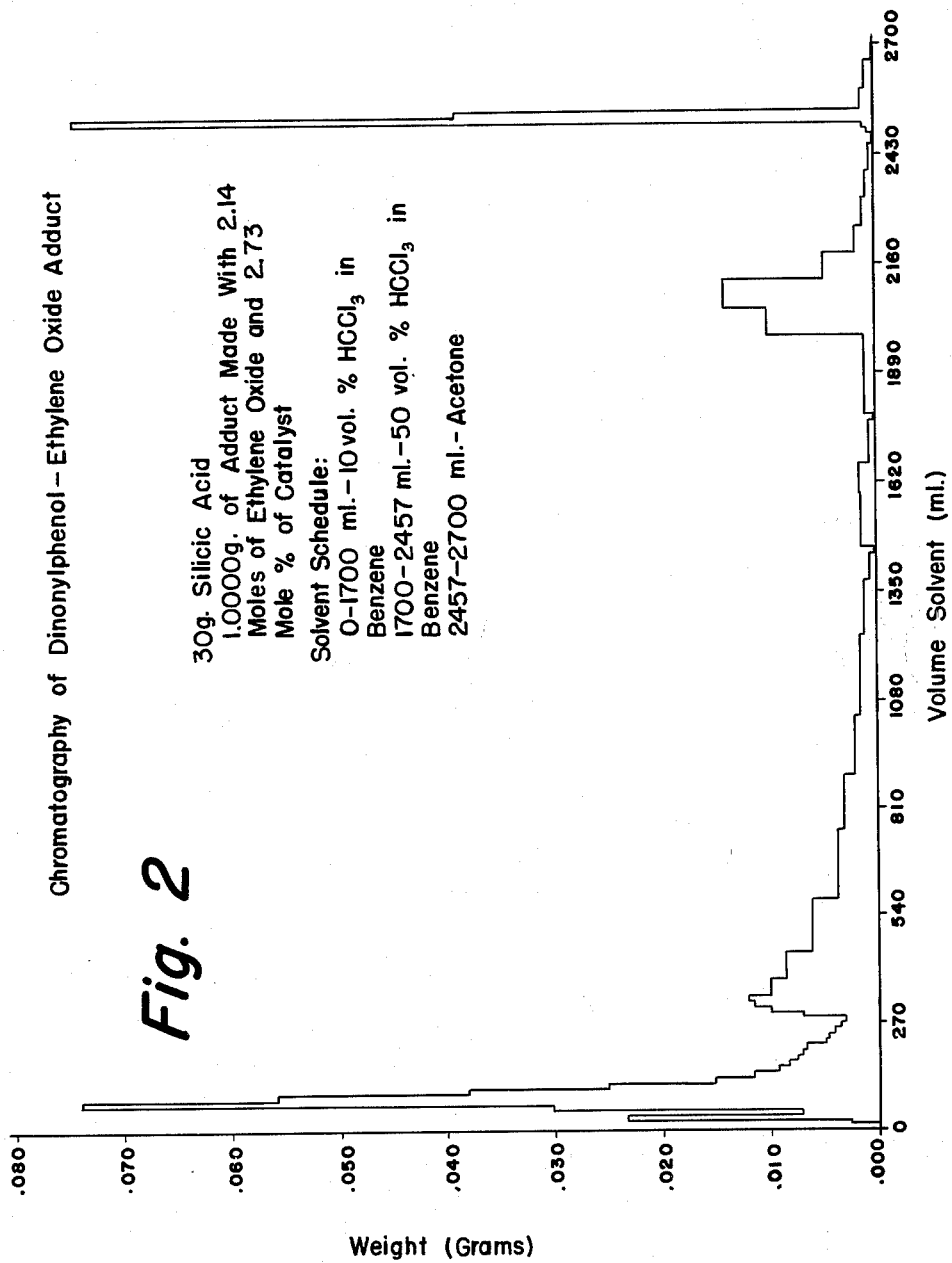

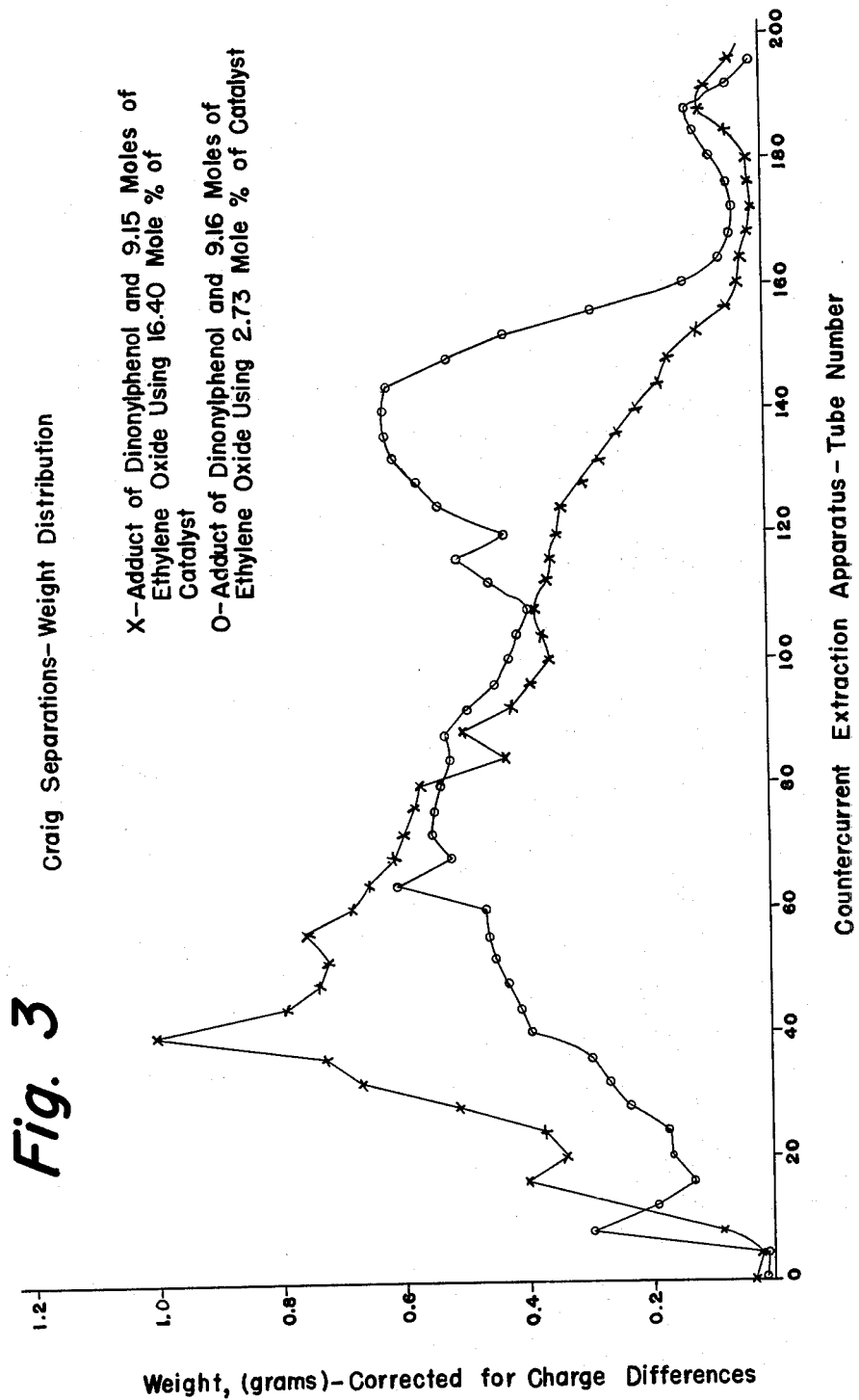

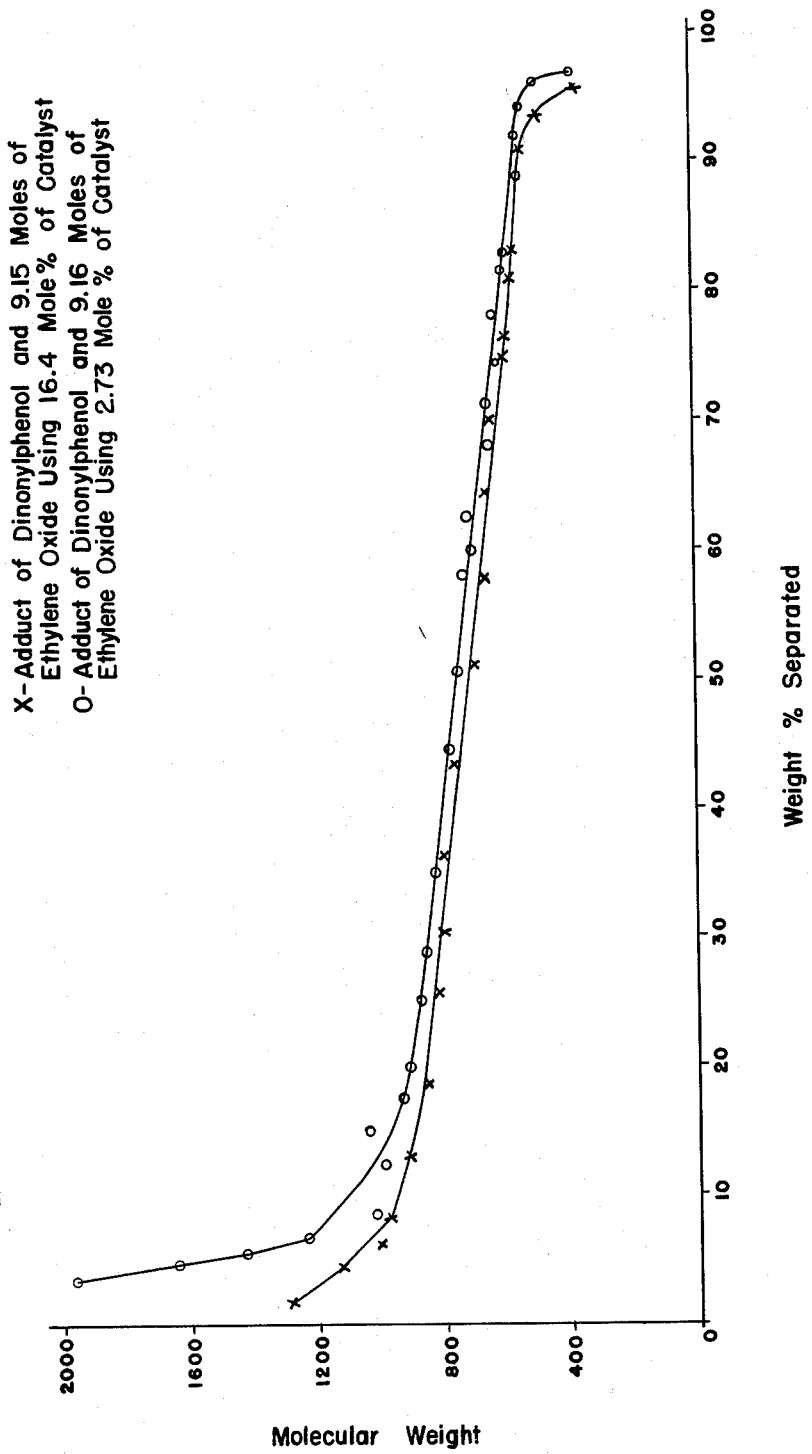

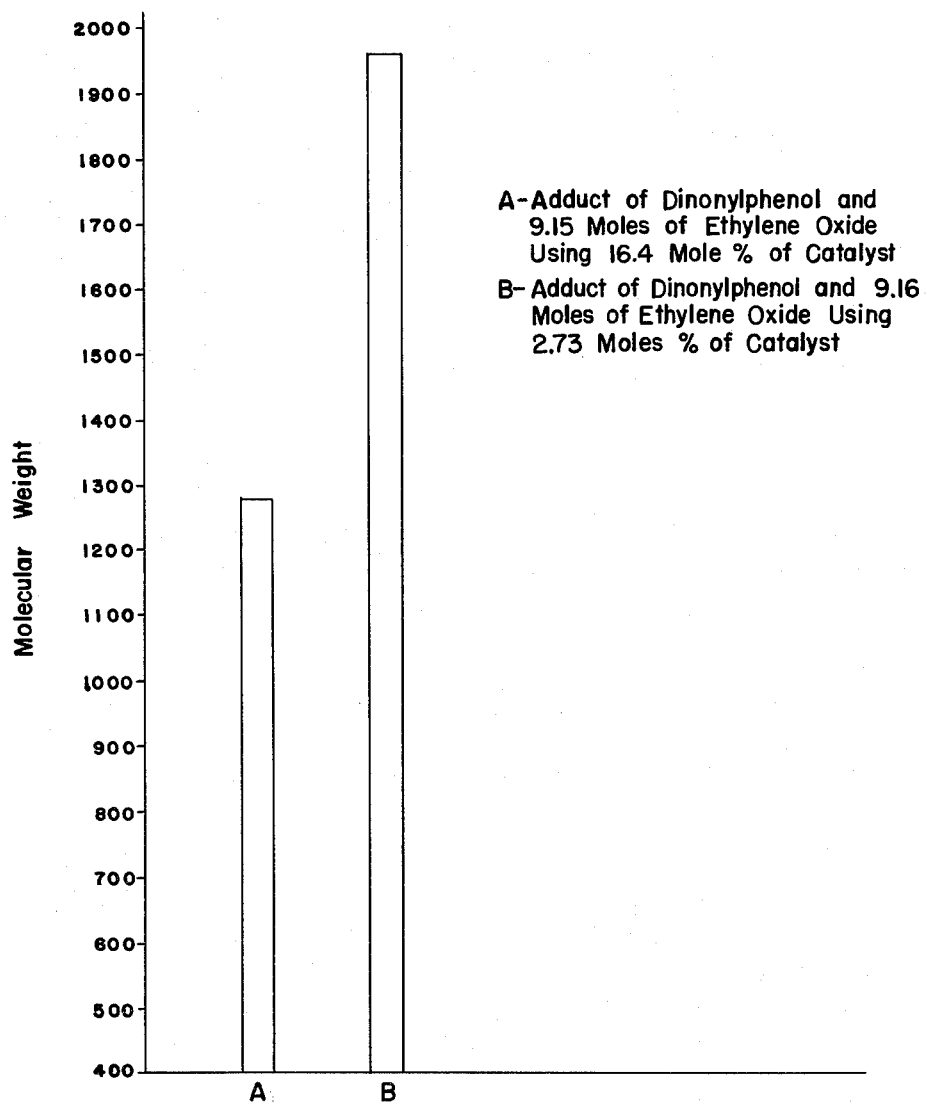

3,100,230
METHOD OF PREPARING DIALKYLPHENOL-ETHYLENE OXIDE ADDUCTS WITH RELATIVELY NARROW MOLECULAR WEIGHT DISTRIBUTION
Richard C. Mansfield, Haddonfield, N.J., assignor to Rohm & Haas Company, Philadelphia, Pa., a corporation of Delaware
Filed Dec. 15, 1959, Ser. No. 859,812
3 Claims. (Cl. 260—613)

This invention relates to ethylene oxide adducts of dialkylphenols.

The prior art has known of addition products of dialkylphenols and has found them to be particularly useful as emulsifying agents. As an example, U.S. Patent 2,593,112 may be cited. It disclosed that when about 10-25 molecules of ethylene oxide are added to a dialkylated phenol, in which each alkyl substituent has at least six carbon atoms and the sum of the carbon atoms in the alkyl substituents exceeds fourteen, greater emulsifying power can be obtained than with somewhat analogous dialkylphenol-ethylene oxide adducts which had been previously disclosed, e.g., in U.S. Patent 2,213,477.

In stating that a certain number of moles of ethylene oxide are added to another compound, such as a dialkylphenol, it is generally known and understood that this will lead to a product having a relatively broad molecular weight distribution range. That is, although the average molecular weight of the entire product may indicate that the average number of moles of ethylene oxide therein approximates the number of moles thereof which were added, any given molecule of the ultimate product actually may have more or less ethylene oxide than the said average number.

Thus, in a case where 10 moles of ethylene oxide are added to a dialkylphenol by a conventional process, such as is described in U.S. Patent 2,593,112, the product may have an average of 10 moles of ethylene oxide per mole of the dialkylphenol; but there may be some moles of the product which have as little as 2 moles or as much as 35 moles of ethylene oxide. This relatively wide range of molecular weight distribution of the (poly)ethoxy portion of such adducts, although varying in degree from one product to another, is in many instances a strong deterrent to the maximum utility which can be derived from the ultimate product.

My invention overcomes this obstacle by providing novel compositions and a simplified method for their manufacture, in which the molecular weight distribution of the ethylene oxide adducts is relatively narrow. This is accomplished by employing considerably higher amounts of the catalyst than have heretofore been deemed desirable or feasible in reactions whereby ethylene oxide is added to a dialkylphenol.

My invention will be understood from the following description, together with the accompanying drawings, wherein:

FIG. 1 is a graph showing the chromatographic separation of an adduct of a dinonylphenol and 2.13 moles of ethylene oxide made with 16.4 mole percent of catalyst;

FIG. 2 is a graph showing the chromatographic separation of an adduct of a dinonylphenol and 2.14 moles of ethylene oxide made with 2.73 mole percent of catalyst;

FIG. 3 is a graph of two Craig counter-current separations or extractions illustratively comparing the molecular weight distribution in a sample of dinonylphenol to which has been added 9.15 moles of ethylene oxide using 16.4 mole percent catalyst and a sample of dinonylphenol to which has been added 9.16 moles of ethylene oxide using 2.73 mole percent of catalyst;

FIG. 4 is a graph similar to FIG. 3, corresponding to the data set forth in Table IX and showing the molecular weights calculated from the observed absorbance versus weight percent separated; and FIG. 5 is a graph similar to FIG. 4 showing the spread of molecular weights calculated from the observed absorbance values.

Usually, as in U.S. Patent 2,593,112, the concentration of the catalyst is from about 1 to about 3 mole percent of the dialkylphenol used. As far as is known, never before has more than about 6 or 7 mole percent been used in the oxyethylation of dialkylphenols. By sharp contrast, the present invention involves the use of from 10 to about 80 mole percent. One result has been compositions which are oil-soluble emulsifiers which are unexpectedly far superior to those which have been obtainable with the lower amounts of catalyst known to the prior art. In addition, there have been provided useful agricultural emulsifiers, such as are employed in dormant spray oils and various herbicidal systems, and excellent rust-inhibiting oil additives.

The oil solubility and emulsifying properties of the novel compositions prepared in accordance with the present invention are superior for the following reasons. It is known to add ethylene oxide to dialkylphenols so that the hydrophobe-hydrophile balance is such that the material is oil-soluble yet has emulsifying properties. However, if the conditions of the prior art are followed, the products either are not completely oil-soluble in the common solvent oils because of having hydrophilic portions which are too long, or they do not possess sufficient emulsifying properties because of having hydrophilic portions which are too short. The reason for this paradox, it has been discovered, is that under the conditions described in the prior art, a relatively wide molecular-weight distribution range of products is obtained when ethylene oxide is added to dialkylphenols. The lower molecular weight members are oil-soluble but poor emulsifiers, and the higher molecular weight members are good emulsifiers but oil-insoluble.

The improved oil-soluble emulsifiers which thus are obtained, by being considerably more soluble in the common oil solvents, eliminate much of the need for blending them with other oil-soluble materials to obtain the clear solutions which are highly desirable in various applications. An additional advantage resides in the fact that the higher catalyst concentrations provide faster rates of reaction during the oxyethylation and thus make it possible to run the reaction at lower temperatures. A still further advantage resides in the fact that the emulsifiers provided by the present invention have a low tendency to cause foaming of the emulsions.

The unique products of the present invention are obtained by adding from 2 to about 25 moles of ethylene oxide to a dialkylated phenol in which the sum of the carbon atoms in the alkyl substituents ranges from 4 to 37, each substituent having at least one carbon atom. To be effective, the alkylated phenols with which this invention is concerned must have at least one, but not two, bulky alkyl groups such as an isopropyl, t-butyl, or higher branched chain alkyl group in the ortho- position of the phenol. Normal, bulky alkyl groups in the ortho- position are also useful, although in some instances their operativeness in this invention is not quite as effective as the branched chain groups. The dialkylated phenols may be prepared in any suitable manner, such as by the conventional means in which the desired olefins are caused to act upon a phenol in the presence of a gaseous condensing agent, such as boron fluoride.

Examples of alkylated phenols to which the ethylene oxide is to be added are diamylphenol, dihexylphenol, diisoheptylphenol, dioctylphenol, dioctyl-o-cresol, octadecyl-cresol, dinonylphenol (generally a mixture of isomers averaging 9 carbon atoms), didecylphenol, didodecylphenol, and the like.

Conversion of the alkylated phenols to the desired addition products can be accomplished by treating the phenols with ethylene oxide in the presence of a catalyst such as the alkali metals or their hydroxides, carbonates, or alcoholates, at temperatures between about 120° and 200° C. The ethylene oxide is added in whatever quantity is necessary to give a product with the characteristics which are desired for a specific application.

EXAMPLE 1

The oxyethylation of branched chain alkylated and normal straight chain alkylated phenols at relatively high catalyst concentrations, which features the present invention, provides many novel and useful effects which cannot be obtained with the products made with the low catalyst concentrations of the prior art. Mention has been made above of the narrower ranges of ethylene oxide distribution in the products which result with the use of the higher catalyst concentration. Evidence of the fact that there is a difference in ranges (i.e., a difference in the actual composition of the products) can be seen from the data in Table I where a comparison is made of the cloud points of various dinonylphenolethylene oxide adducts at different levels of ethylene oxide and catalyst (KOH) concentrations.

*Table I*

| Moles of ethylene oxide | Mole percent of catalyst | Cloud point (° C.) |
| --- | --- | --- |
| 18.0 | 2.73 | 64.4 |
| 18.0 | 16.40 | 67.0 |
| 20.0 | 2.73 | 77.0 |
| 20.0 | 10.90 | 80.5 |
| 20.0 | 27.30 | 83.5 |
| 22.1 | 5.45 | 88.5 |
| 22.0 | 10.90 | 90.0 |
| 21.9 | 16.40 | 90.0 |

Since the weight ratios have remained essentially unchanged at each level of ethylene oxide content, the increase in the cloud point which results as the amount of catalyst is increased must result from the difference in distribution of the ethylene oxide.

EXAMPLE 2

The differences in compositions, as well as the resulting differences in oil solubility, may be seen from the data in Table II. There, the solubility (in a 150-second neutral base oil containing a metal sulfonate) of a dinonylphenol with 6 moles of ethylene oxide added by the conventional low catalyst method is compared with the solubility of basically the same adduct prepared by the novel high catalyst process of this invention.

*Table II*

| Moles of ethylene oxide | Mole percent of catalyst | Weight percent added to base oil [1] | Days Storage | | |
| --- | --- | --- | --- | --- | --- |
| | | | 1 | 3 | 5 |
| | | | Solubility [2] at room temperature | | |
| 6.00 | 3.82 | 0.5 | H | H | H |
| | | 1.0 | T | T | T |
| 5.96 | 10.90 | 0.5 | C | C | C |
| | | 1.0 | C | C | C |
| 6.00 | 16.40 | 0.5 | C | C | C |
| | | 1.0 | C | C | C |
| 5.96 | 27.30 | 0.5 | C | C | C |
| | | 1.0 | C | C | C |
| 5.91 | 54.50 | 0.5 | C | C | C |
| | | 1.0 | C | C | C |
| 5.90 | 80.00 | 0.5 | C | C | C |
| | | 1.0 | C | C | C |
| 5.95 | 100.00 | 0.5 | H | H | H |
| | | 1.0 | T | T | T |

[1] Base oil consisted of a 150-second neutral containing a metal sulfonate.
[2] C=clear (soluble); H=haze (insoluble); T=turbid (insoluble).

The data in Table II further shows the criticality of the high catalyst concentration. Below 10–11 mole percent, the product is insoluble in the oil as indicated; above that level and up to 80 mole percent, the product is soluble in the oil; but, when as much as 100 mole percent catalyst is employed, the product is insoluble. All of these data in Table II confirm the fact that whenever a dialkylphenol-ethylene oxide adduct is prepared with the aid of a quantity of catalyst within the range claimed for the present invention a new product is formed which is both different from and better than compositions made with the low catalyst concentrations as known to the prior art.

EXAMPLE 3

The differences in composition are further reflected in the data given in Table III. There, the solubility of a dinonylphenol with 25 moles of ethylene oxide added by the conventional low catalyst method is compared with the solubility of basically the same adduct prepared by the novel high catalyst process of this invention. In this instance, the ethoxylated dinonylphenol was mixed with a toxaphene-kerosene emulsion concentrate in the ratio of 60% toxaphene, 36% kerosene, and 4% of the dinonyl phenolethylene oxide adduct. The degree of solubility was tested by noting whether crystals formed in the air or liquid phases after standing for six days. The results were as follows:

*Table III*

| Moles of ethylene oxide | Mole percent of catalyst | Formation of crystals | |
| --- | --- | --- | --- |
| | | Air | Liquid |
| 24.8 | 5.45 | Yes | No. |
| 25.2 | 10.90 | No | No. |
| 25.1 | 16.40 | No | No. |
| 24.9 | 64.30 | No | No. |
| 24.9 | 80.00 | No | No. |
| 24.9 | 99.95 | Yes | Yes. |
| 24.6 | [1] 100.00 | Yes | Yes. |

[1] Min.

The data in Table III further show the criticality of the high catalyst concentration. Below 10–11 mole percent, the product is relatively insoluble in the emulsion concentrate as indicated; above that level and up to 80 mole percent, the product is soluble in both the air and liquid phases; but, when as much as 100 mole percent catalyst is employed, the product is insoluble. Thus, the data in Table III further confirm the fact that whenever a dialkylphenol-ethylene oxide adduct is prepared with the aid of a quantity of catalyst within the range claimed for the present invention a new product is formed which is both different from and better than compositions made with the low catalyst concentrations as known to the prior art.

EXAMPLE 4

Dinonylphenol was condensed with 9 moles of ethylene oxide using a variety of catalyst (KOH) concentrations in excess of those used in the prior art. From this series of reactions, in which conventional operating procedures were used, there were obtained materials which are good oil-soluble emulsifiers. Testing of these materials for oil-solubility clearly established that the solubility is greatly affected by catalyst concentration. Table IV shows how solubility in a refined kerosene is directly affected by catalyst concentration. (Note: The use of deodorized kerosene makes the test more severe, incidentally, as the refining process takes out some of the aromatics which are effective in solubilizing oil-soluble emulsifiers, and leaves it rich in aliphatics.)

Table IV

| Mole Percent catalyst | Weight E.O.[1]/ Weight DNP[2] | Percent insoluble at 2% in Ultrasene | Percent insoluble at 1% in Ultrasene |
|---|---|---|---|
| 2.73 | 1.10 (E9.0) | 17 | 17 |
| 5.45 | 1.10 (E9.0) | 8 | 4 |
| 8.18 | 1.11 (E9.0) | 8 | 2 |
| 10.9 | 1.12 (E9.1) | 4 | 2 |
| 13.6 | 1.12 (E9.1) | 2 | 0 |
| 16.4 | 1.11 (E9.0) | 0 | 0 |

[1] E. O = ethylene oxide.   [2] DNP = dinonylphenol.

In addition, compositions made at 16.4 mole percent catalyst, and having 8.0, 8.6, 9.0, 9.2, and 9.6 moles of ethylene oxide added were all completely soluble at all concentrations from 1 to 99% in deodorized (highly refined) kerosene.

EXAMPLE 5

Illustrations of the superiority (oil solubility and emulsion performance) of the novel products of this invention can be found in the following data. The emulsifier which was tested in dormant spray oils was a dinonylphenol adduct with 8.0 moles of ethylene oxide prepared in accordance with this invention and using 16.40 mole percent catalyst. One and five percent solutions of this emulsifier in a commercially available dormant oil (Sun Oil #11) were prepared, shaken well, and centrifuged. No insoluble material settled at the bottom of the centrifuge tube from either of these solutions.

By comparison, a DNPE$_8$ (dinonylphenol—8 moles of ethylene oxide adduct) prepared by using 2.73 mole percent of catalyst was not completely soluble at 1 to 5% in the dormant oil.

When 2 parts of a 1% solution of the DNPE$_8$ emulsifier, made in accordance with this invention as described above, were forced into 98 parts of tap water and the container was inverted, an emulsion occurred. This showed no free oil separating in 15–30 minutes. The foam of this emulsion was substantially less than that of emulsions prepared similarly from commercially available "oil-soluble" emulsifiers.

EXAMPLE 6a

Evidence of the superiority (oil solubility and emulsion performance) of the novel products of this invention in refined kerosenes can be found in the following results.

Solutions of 2% DNPE$_9$ in a deodorized kerosene were prepared from each of a number of the dinonylphenol-ethylene oxide adducts made with at least three different amounts of catalyst. Twelve (12) ml. of each solution was centrifuged at 2600 r.p.m. for 20 minutes at room temperature. The percent separation of the added emulsifier was then determined for each solution; the data thus obtained was as follows:

Table V

| Mole percent catalyst (KOH) | Percent separation |
|---|---|
| 2.73 | 8 |
| 10.90 | 4 |
| 16.40 | 0 |

EXAMPLE 6b

A procedure similar to that described in Example 6a was followed, the changes being the use of 10% DNPE$_9$ solutions in deodorized kerosene which were then refrigerated at 2° C. to determine whether and how much of the dinonylphenol-ethylene oxide adduct would separate out from the Ultrasene. The results were as follows:

Table VI

| Mole Percent Catalyst (KOH) | Wt. Percent Separated |
|---|---|
| 2.73 | 5.5 |
| 5.45 | 3.2 |
| 13.63 | 2.4 |
| 16.40 | 1.9 |
| 27.30 | 0.9 |

EXAMPLE 7

As a further example of the utility of this invention, rusting tests were run on various blends of a multigrade SAE 10 W–30 oil containing a metal sulfonate detergent, with different oxyethylated isononyl phenols made with high catalyst concentrations. Neither the oil nor the detergent possessed rust-inhibiting properties, as determined by coating SAE 1010 steel panels with each and confining them within a humidity cabinet in accordance with the standard test set forth in the U.S. Government specification JAN–H–792 (formerly the Joint Army-Navy specification AN–H–31). In one day, each of the panels so tested was completely covered with rust.

The same test was repeated two more times except that in these runs there was added to the oil-detergent composition an oxyethylated dinonylphenol prepared with the high catalyst concentration of this invention. The phenol used had been prepared in two batches, one with 16.4 mole percent catalyst and the other with 27.3 mole percent catalyst. In making the additions, 0.5 weight percent samples were used to form the test compositions. Steel panels covered with each of these different compositions showed no rust spots at all after five days.

EXAMPLE 8a

The previous examples have given evidence that completely new and highly improved products are obtained with the high catalyst methods of the present invention, by comparing their performance characteristics with those of the products obtained by the low catalyst methods of the prior art. Because of that evidence to the effect that the products must be different, it could be deduced that the differences are due to their different molecular weight distributions since every other possible variable had been maintained unchanged. In the present instance, and in Example 8b, this deduction is proven even more conclusively by means of chromatographic studies and countercurrent extractions.

The quantitative data obtained by the chromatographic studies show that the composition of a sample (A) of a dinonylphenol with 2.13 moles of ethylene oxide prepared with 16.40 moles percent of catalyst is significantly different from that of a sample (B) of the same dinonylphenol with 2.14 moles of ethylene oxide prepared with 2.73 mole percent of catalyst. Two runs were made, as nearly identical as possible, the charge being 1.0000 g.

In each case, there was used a 53 x 2 cm. column, with an outer ball joint at the top.

This was charged with a slurry of 30 g. silicic acid in reagent-grade benzene which had been prepurified by passing it through a column of aluminum oxide specifically adapted for chromatographic adsorption. Glass wool and Ottawa Sand were used at the top and bottom of the column for protection of the surfaces from mechanical disturbances. The dinonylphenol-ethylene oxide adduct was charged as a solution in 5-10 ml. of benzene. The column was run under a pressure of about 25 cm. of dried, purified nitrogen applied at the top via the ball-joint connection. Measured volume fractions were collected, evaporated, free of solvent, and the eluted adsorbate weighed. The solvent schedule was:

(1) 0-1620 ml.—10 vol. percent $HCCl_3$ in benzene (for first peak);
(2) 1620-2500 ml.—50 vol. percent $HCCl_3$ in benzene (for second peak);
(3) 2500-2700 ml.—reagent-grade acetone, prepurified over reagent aluminum oxide (for third peak).

The weights (in grams) of the ethylene oxide adducts, as found by the above experiments and as determined from the theoretical (calculated by the method of Flory, 62 J.A.C.S. 1561 (1940), were as follows:

Table VII

| Moles of ethylene oxide | With 16.4 mole percent catalyst | | With 2.73 mole percent catalyst | |
|---|---|---|---|---|
| | Found | Calc. | Found | Calc. |
| Impurity | .0328 | | .0332 | |
| 1 | .2463 | .2770 | .3087 | .2739 |
| 2 | .3684 | .3485 | .3267 | .3476 |
| 3 | .2204 | .2168 | .1776 | .2183 |
| >3 | .1311 | .1249 | .1217 | .1270 |
| | .9990 | .9672 | .9679 | .9668 |

These data are graphically represented in FIG. 1. Molar extinction coefficients were determined spectrophotometrically for the various fractions by the method of Kelley and Greenwald, 62 J. Phys. Chem. 1096 (1958), using a Beckman DK-2 Spectrophotometer and isooctane as the solvent. The absorbency was read directly at the maximum (276 m$\mu$). This band is due to the benzene ring in these compounds.

Table VIII

| Moles of ethylene oxide | Products made with 16.4 mole percent catalyst | Products made with 2.73 mole percent catalyst |
|---|---|---|
| 1 | $1.88 \times 10^3$ | $1.92 \times 10^3$ |
| 2 | $1.93 \times 10^3$ | $1.89 \times 10^3$ |
| 3 | $2.02 \times 10^3$ | $1.91 \times 10^3$ |
| >3 | $1.92 \times 10^3$ | $1.82 \times 10^3$ |

The calculation of the molar extinction coefficient, $$E \text{ max.} = \frac{A \times M.W.}{Conc. \times Cellpath}$$

is dependent upon the assignment of the correct molecular weight for the material being examined. The calculated values show that the molecular weights have been assigned with an accuracy of ±5%. The assigned molecular weights for the >3 ethylene oxide fractions were calculated from the theoretical distribution as determined by the method of Flory.

Flory's method of calculation, incidentally, makes the three following assumptions:
(1) The number of propagating molecules remain constant throughout the polymerization.
(2) The rate constant for addition of ethylene oxide to all polymers is equal regardless of polymer length.
(3) All of the original propagating molecules (dinonylphenol) react with one mole of the ethylene oxide before appreciable chaining occurs.

If one considers the second assumption, it must follow that since there is a difference in distribution between a pair of samples such as $DNPE_2$ (an adduct of dinonylphenol and 2 moles of ethylene oxide), one prepared at high and the other at low catalyst concentrations, there must be corresponding differences in distribution between any such pair of samples having more than two moles of ethylene oxide added to the dinonylphenol and prepared at different (e.g., 16.40 vs. 2.73 mole percent) catalyst concentrations. Evidence of this fact may be seen in Example 8b below.

Examination in the infrared indicated that the material in the first peak (FIGS. 1 and 2) obtained from chromatographic separations of $DNPE_2$ consisted primarily of alkyl-aryl ethers, hydrocarbons, and a small amount of dinonylphenol. The materials in peaks 2 and 3 were shown to be $DNPE_1$ and $DNPE_2$, respectively ($E_1$ and $E_2$ referring to one and two moles of ethylene oxide).

The elemental analyses of the fractions obtained from the two separations of $DNPE_2$ generally showed good agreement with the theoretical values, especially when it is taken into consideration that the actual molecular weight of the dinonylphenol portion of each fraction is subject to variation due to the composition of the "nonenes" used in its preparation. The theoretical molecular weight for dinonylphenol ($C_{24}H_{42}O$: 347) was used in the calculations, and this may be only an approximation of the actual molecular weight of the dinonylphenol which was actually used as the substrate in the ethylene oxide addition. The results, for sample A (which, as indicated in FIG. 1, is the dinonylphenol—2.13 moles of ethylene oxide adduct made with 16.4 mole percent catalyst) and for sample B (which, as indicated in FIG. 2, is made with 2.73 mole percent catalyst) are as follows:

Table IX

| Moles of ethylene oxide | Sample A | | Sample B | | Calculated [1] | |
|---|---|---|---|---|---|---|
| | C | H | C | H | C | H |
| 1 | 79.78 | 11.81 | 79.88 | 11.93 | 79.94 | 11.87 |
| 2 | 77.29 | 11.93 | 76.96 | 11.40 | 77.36 | 11.59 |
| 3 | 74.48 | 11.18 | 74.33 | 11.21 | 75.26 | 11.37 |
| >3 | 72.54 | 10.83 | 71.15 | 10.82 | 72.99 | [2] 11.13 |

[1] Based on dinonylphenol molecular weight equals 347.
[2] Calculated for theoretical distribution of >3 moles of ethylene oxide determined by the method of Flory.

EXAMPLE 8b

Countercurrent extractions, which were run on the well-known Craig apparatus with samples of $DNPE_9$ (dinonylphenolethylene oxide adduct with 9 moles of ethylene oxide), have further confirmed the fact that the use of relatively high catalyst concentrations in oxyethylations of dinonylphenol results in products with narrow molecular weight distributions. Actually, the samples used were $DNPE_{9.15}$ prepared with 16.4 mole percent catalyst (sample A), and $DNPE_{9.16}$ prepared with 2.73 mole percent catalyst (sample B). FIG. 3 graphically represents the results of these separations, showing weight distribution, and demonstrates quite clearly that the material prepared with the higher catalyst concentration has a narrower distribution than that prepared with the low catalyst concentration.

Molecular weights were determined on every fourth fraction of both separations by the ultraviolet spectrophotometry method described in Example 8a. Solvents used were chloroform, methanol, and isooctane. The maximum absorbancy occurred at 276 m$\mu$ except for the first few cuts and the last few cuts, which is where any impurities (such as polyethylene glycols, polyolefins, nonylphenyl ethers, etc.) could be expected to occur.

The molecular weights were calculated using the relationship $$M.W. = \frac{E \max. \times \text{concentration} \times \text{cellpath}}{A}$$

where $E$ max.=extinction coefficient, and $A$=absorbance. The value of $1.90 \times 10^3$ was used for E max. on the basis of the results obtained from the analysis of the chromatographically purified samples of $DNPE_1$ and $DNPE_2$. It was found that E max. did not vary with the solvents used. This was established by determining the absorbancy of a sample of $DNPE_1$ in methanol, chloroform, and isooctane. The calculated E max. values from these determinations were all $1.90 \pm 0.02 \times 10^3$.

FIG. 4 is a plot of the molecular weights of the fractions determined as described above versus weight percent separated, with sample A once again representing a composition prepared with 16.40 mole percent catalyst and sample B representing a composition prepared with 2.73 mole percent catalyst.

From FIG. 4 the data set forth in Table X were obtained:

*Table X*

|  | Sample A | Sample B |
|---|---|---|
| Percent of mixture with M.W. equals 400–1,000 | 87.3 | 82.8 |
| Percent of mixture with M.W. equals >1,000 | 5.9 | 10.4 |
| Percent impurities | 6.8 | 6.8 |
| M.W. range of identified dinonylphenol-ethylene oxide adduct | 400–1,285 | 400–1,965 |

FIG. 5 is a graph, based on Table X, showing the range of molecular weights of the same samples A and B as determined by calculation from the observed absorbance values, using the relationship described above. This graph shows, quite dramatically, the wide differences in weight distribution of dinonylphenolethylene oxide adducts that can be obtained by using different amounts of catalyst. The comparative results there depicted show quite clearly that when the relatively high amounts of catalyst are used in accordance with this invention the molecular weight distribution is far narrower than when the relatively low amounts of catalyst are used as in the prior art.

EXAMPLE 9

General instructions for the preparation of the addition products of the present invention, by treating the alkylated phenols with ethylene oxide in the presence of a suitable catalyst, were given above. No invention, of course, is hereby claimed to any novelty in the process except for the unique use of relatively high quantities of catalyst which produces the unexpected and superior results described in the previous examples. However, it may be useful for those who would practice the present invention to have the complete procedure set forth in this specification so as to simplify their operation. Thus, there follows a typical procedure in complete detail, in this instance employing 16.40 mole percent catalyst to prepare $DNPE_9$.

Into a tared flask equipped with a stirrer, thermometer, vent, and gas inlet were weighed 4.5 parts (0.068 moles) of powdered 85% KOH and 150 parts (0.417 moles) of dinonylphenol (OH No.=156; equivalent weight=360).

The catalyst concentration based on dinonylphenol is therefore 16.4 mole percent ($0.068 \times 100 \div 0.417 = 16.4\%$). The flask was sealed and stirring commenced. Vacuum and heat were applied and the contents were stirred for 1 hour at 125°–135° C. at a pressure of 2–10 mm. Hg to strip off water. The vacuum was turned off and the system was brought to a pressure of about 4 p.s.i. with dry nitrogen. A flask containing 175 parts of liquid ethylene oxide was attached to the system, and it was flushed 8 times with nitrogen. The flask containing the dinonylphenol was heated to 150° C. during which time the system was flushed five times with ethylene oxide by warming the flask containing the ethylene oxide so that the pressure in the system increased to about 4 p.s.i., and then venting to about 1 p.s.i. The ethylene oxide was added to the vigorously stirred dinonylphenol during 40 minutes at $150 \pm 2°$ C. while the pressure in the system was maintained at about 4–6 p.s.i. by warming the flask containing the ethylene oxide. When all the ethylene oxide had distilled into the reaction flask, the system was filled to about 4 p.s.i. with nitrogen and then cooled to room temperature. The system was vented, flushed twice with nitrogen, and the flask removed and weighed. The weight increase was 167 parts. This corresponds to formation of $DNPE_{9.07}$; wt. ethylene oxide (EO)/wt. dinonylphenol (DNP)=1.11. The contents were then stirred for one-half hour while carbon dioxide gas was bubbled in to neutralize the catalyst.

A 200-part portion of the product was transferred to a 3-neck flask equipped with stirrer, thermometer, and condenser, and having a stopcock on the bottom. It was then diluted with 100 parts of toluene, stirred, and further diluted with 50 parts of tap water. The stirred mixture was heated to 80° C. and then allowed to stand one-quarter hour at 80° C. The bottom aqueous layer of 41 parts was removed via the stopcock. It was basic to pH paper. A second 50-part portion of water was added; the mixture was stirred and reheated to 80° C. and then allowed to stand one-quarter hour at 80° C. The bottom aqueous layer of 46 parts was removed. It was weakly basic to pH paper. A third 50-part portion of water was charged; the mixture was again stirred and heated to 80° C. and then allowed to stand one-half hour at 80° C. The bottom aqueous layer of 52 parts was removed. It was neutral to pH paper. The slightly turbid toluene solution was held at 90°–95° C./2–10 mm. Hg to remove all solvents and give 195 parts of a clear, light yellow product.

In a like manner, other oxyethylated dinonylphenols were prepared, the polyglycol chain lengths being predetermined by the amount of ethylene oxide charged to the system. The following table lists some of these preparations.

*Table XI*

| Moles EO/mole DNP | Mole percent KOH | Temp. at which EO added, ° C. |
|---|---|---|
| 7.97 | 16.4 | 140±5 |
| 8.58 | 16.4 | 140±5 |
| 9.18 | 16.4 | 140±5 |
| 9.60 | 16.4 | 140±5 |
| 9.0 | 16.4 | 150±2 |
| 9.0 | 16.4 | 130±2 |
| 9.1 | 13.6 | 170±2 |
| 9.1 | 13.6 | 150±2 |
| 9.1 | 13.6 | 130±2 |
| 9.1 | 13.6 | 130±2 |
| 9.1 | 10.9 | 170±2 |
| 9.1 | 10.9 | 150±2 |
| 9.0 | 8.18 | 190±2 |
| 9.1 | 8.18 | 170±2 |
| 9.0 | 5.45 | 190±2 |
| 9.0 | 2.73 | 190±2 |

All of the materials prepared at a catalyst concentration of 16.40 mole percent were completely soluble at 2% and at 1% in deodorized kerosene. The others showed varying degrees of insolubility depending on catalyst concentration used during the preparation. Generally, the more catalyst, the greater the solubility.

EXAMPLE 10

Using the same general procedure described in Example 9, diamylphenol was oxyethylated. Two reactions were carried out which were identical in all respects except catalyst concentration. In each case, 4.27 moles of ethylene oxide/mole of 2,4-ditertiary-amylphenol were added. The catalyst concentration used in one reaction was 1.79 mole percent, and in the other reaction it was 10.60 mole percent.

The products of both reactions were evaluated for solubility in deodorized kerosene by shaking 2% solutions of the products in the solvent for 2 minutes and allowing them each to stand for 5 minutes. The solution prepared with the 1.79 mole percent catalyst was hazy; that prepared with 16.40 mole percent catalyst was clear. After standing overnight, some material was found to have become separated from the 1.79 mole percent catalyst preparation which was still hazy. The solution from the 16.40 mole percent catalyst preparation remained clear and no separation occurred. The deodorized kerosene solutions formed emulsions when mixed with water.

I claim:

1. The method of preparing a composition consisting of a mixture of compounds each having the general formula

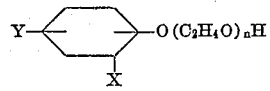

wherein X is an alkyl group having at least three carbon atoms and Y is an alkyl group having at least one carbon atom, the sum of the carbon atoms in X and Y ranging from 4 to 37, and $n$ is an average number ranging from 2 to 25, said method consisting in the steps of reacting a dialkylated phenol with ethylene oxide, the dialkylated phenol having at least one, but no more than one, alkyl group in the ortho-position, the size of the alkyl group being in the range of isopropyl to octadecyl, and the amounts of the dialkylated phenol and ethylene oxide being present in accordance with the above formula, the reaction taking place in the presence of about 10 to about 80 mole percent of a catalyst, based on the alkylated phenol, from the group consisting of the alkali metals and their hydroxides, carbonates and alcoholates at temperatures between about 120° and about 200° C.

2. The method of claim 1 in which the dialkylphenol is in the range of from diamylphenol to dinonylphenol.

3. The method of claim 1 in which the dialkylphenol is a mixture of isomers in which X and Y each averages nine carbon atoms.

References Cited in the file of this patent

UNITED STATES PATENTS

| | | |
|---|---|---|
| 2,593,112 | Cross et al. | Apr. 15, 1952 |
| 2,695,914 | De Groote | Nov. 30, 1954 |
| 2,695,915 | De Groote | Nov. 30, 1954 |
| 2,815,332 | Grosser | Dec. 4, 1957 |
| 2,983,763 | Krause | May 9, 1961 |